United States Patent
Kursawe et al.

(10) Patent No.: US 6,918,957 B2
(45) Date of Patent: Jul. 19, 2005

(54) AQUEOUS COATING SOLUTION FOR ABRASION-RESISTANT SIO$_2$ ANTIREFLECTION LAYERS

(75) Inventors: Monika Kursawe, Seeheim-Jugenheim (DE); Walther Glaubitt, Margetshoechheim (DE)

(73) Assignee: Merck Patent GmbH, Darmstadt (DE)

( * ) Notice: Subject to any disclaimer, the term of this patent is extended or adjusted under 35 U.S.C. 154(b) by 269 days.

(21) Appl. No.: 09/978,770

(22) Filed: Oct. 18, 2001

(65) Prior Publication Data

US 2002/0090519 A1 Jul. 11, 2002

(30) Foreign Application Priority Data

Oct. 18, 2000 (DE) ......................................... 100 51 725

(51) Int. Cl.$^7$ ................................................. C09D 1/00
(52) U.S. Cl. ................................................. 106/287.34
(58) Field of Search .......................... 106/286.1, 286.6, 106/287.34

(56) References Cited

U.S. PATENT DOCUMENTS

| | | | |
|---|---|---|---|
| 5,254,904 A | | 10/1993 | Van De Leest et al. |
| 5,394,269 A | | 2/1995 | Takamatsu et al. |
| 5,580,819 A | | 12/1996 | Li et al. |
| 5,618,585 A | | 4/1997 | Hechler et al. |
| 5,652,476 A | * | 7/1997 | Matsuda et al. ............. 313/478 |
| 5,718,907 A | * | 2/1998 | Labarre ....................... 424/401 |
| 5,723,175 A | | 3/1998 | Scholz et al. |
| 5,972,087 A | * | 10/1999 | Uraki et al. .............. 106/31.65 |
| 6,048,662 A | * | 4/2000 | Bruhnke et al. .......... 430/270.1 |
| 6,329,017 B1 | * | 12/2001 | Liu et al. ..................... 427/240 |

\* cited by examiner

*Primary Examiner*—Margaret G. Moore
(74) *Attorney, Agent, or Firm*—Millen White Zelano & Branigan, P.C.

(57) ABSTRACT

Aqueous coating solution having a pH of from 3 to 8, comprising 0.5–5.0% by weight of $[SiO_x(OH)_y]_n$ particles, where $0<y<4$ and $0<x<2$, having a particle size of from 10 nm to 60 nm with a tolerance of ±10%, and from 0.005 to 0.5% by weight, based on the coating solution, of a surfactant mixture obtainable by hydrolytic polycondensation of tetraalkoxysilanes in an aqueous-alcoholic-ammoniacal medium at temperatures between 35° C. and 80° C., with subsequent removal of ammonia and alcohol from the resultant dispersion by steam distillation and subsequent addition of a surfactant mixture comprising 15–30% by weight of anionic surfactants, 5–15% by weight of nonionic surfactants and less than 5% by weight of amphoteric surfactants.

12 Claims, No Drawings

AQUEOUS COATING SOLUTION FOR ABRASION-RESISTANT SiO$_2$ ANTIREFLECTION LAYERS

The invention relates to a stable, aqueous solution of [SiO$_x$(OH)$_y$]$_n$ particles for the production of an abrasion-resistant, porous SiO$_2$ antireflection layer on substrates, preferably glass, and to a process for the preparation of this solution. The porous SiO$_2$ antireflection layer increases the transmission of light over the entire solar spectrum. Glass which has been provided with a porous SiO$_2$ antireflection layer of this type is therefore particularly suitable for covers of solar collectors and photovoltaic cells.

A number of processes exist for the coating of glasses with the aim of increasing the transmission of light. The application of interference layers is usual. Here, two or more layers of high- and low-refractive-index materials are applied alternately one on top of the other. The reflected waves are then extinguished in a certain wavelength range. Examples thereof are antireflection layers on architectural glass from Schott Glaswerke, which are produced by a sol-gel process and are applied via dip coatings. However, the frequency band width of these antireflection coatings is limited physically to one octave and is therefore only suitable for antireflection coatings in the visible region, but not for antireflection coatings in the broad-band solar spectrum.

Besides the conventional multiple coatings, it is also possible to generate an antireflection action by means of a single coating. In this case, glass is coated with a so-called $\lambda/4$ layer, i.e. a layer having the optical thickness $\lambda/4$ ($\lambda$=wavelength of the incident light), where the refractive index of the layer should ideally have the value $\sqrt{n_D^{(glass)} \cdot n_D^{(air)}}$. In this case, the amplitudes of the reflected waves are extinguished. With a conventional refractive index of low-iron glass of $n_D$=1.5, an optimum refractive index of the antireflection layer of 1.22 arises. In this case, the reflection of electromagnetic radiation having the wavelength $\lambda$ is zero.

The most-used antireflection monolayer of this type is a $\lambda/4$ layer of MgF$_2$ having a refractive index of 1.38 applied by vapor deposition. The residual reflection in this case is 1.2% at the reflection minimum. A lower refractive index cannot be achieved by means of durable, dense layers.

Porous coatings offer the possibility of further reducing the refractive index of a monolayer. Three methods are described for this purpose: etching of glass, application of a porous layer, and a combination of a porous layer and an etching process.

Glasses which are particularly suitable for etching are those which have a phase separation in the matrix, enabling a soluble phase to be dissolved out with the etchant. U.S. Pat. No. 4,019,884 describes a process for the production of an antireflection layer on borosilicate glass having a reflection of less than 2% in the wavelength range 0.4–2.0 mm by heating the borosilicate glass to a temperature of 630–660° C. for 1–10 hours in order to generate a stable surface by phase separation, followed by treatment with hydrofluoric acid for 1–4 hours at 630–660° C. This process has the disadvantage of the use of hydrofluoric acid and poor homogeneity of the etched layer.

U.S. Pat. No. 4,535,026 also discloses the subsequent etching of glasses which have previously been provided with a porous SiO$_2$ layer. The coating solution used for this purpose is obtained by reaction of silicon alkoxide with water and a catalyst in alcohol. The dried gel layer is heated in order to remove organic constituents and to generate an adequate abrasion stability of the layer. A porous SiO$_2$ layer is obtained, but a subsequent etching step is necessary in order to enlarge the pores. Ultimately, this process enables an antireflection layer having 0.1% residual reflection to be obtained.

The preparation of a coating solution which enables the production of an abrasion-stable, porous SiO$_2$ antireflection layer which does not have to be subsequently etched has not been described hitherto. On the contrary, it is a generally accepted procedure in the production of porous antireflection layers to expose the SiO$_2$ gel layers merely to temperatures of up to 500° C. in order to obtain the porosity of the layer and to prevent the layer sintering together, accompanied by a reduction in the pore volume. The refractive index of the layer would thus increase and the effect of the antireflection layer would be impaired (Sol Gel Science, C. J. Brinker, G. W. Scherer, Academic Press 1990, pp. 583, 631). However, heating of the gel layer at the highest possible temperatures is necessary in order to achieve good abrasion resistance of the layer through cross-linking of the orthosilicic acid network in the layer. Cathro et al. in Solar Energy 32, 1984, p. 573, describe that sufficiently wipe-resistant SiO$_2$ antireflection layers on glass would only be obtainable by heating to at least 500° C. Moulten et al. in U.S. Pat. No. 2,601,123 even indicate that the temperature during heat treatment of the gel layer should be in the softening range of the glass. Even higher temperatures are necessary for the production of safety glass. Here, the glass must be softened at a temperature of at least 600° C., generally even 700° C., before it is toughened by a quenching process.

DE 198 28 231 describes a process for the deposition of porous optical layers of metal oxides on glasses, ceramics or metals. An aqueous sol or sol mixture is set to a pH of 2 using hydrochloric acid, a surfactant is added, and the mixture is applied to the substrate to be coated. The coated substrate is heat-treated at temperatures of from 100 to 550° C. The layers obtained do not have adequate abrasion resistance. In a DIN EN 1096-2 abrasion test, they exhibit considerable damage after only 10 strokes.

The invention provides a coating solution for the production of an antireflection layer having a refractive index of 1.25–1.40 which retains its porosity and does not sinter during heat treatment at temperatures above 700° C.

Thus, the invention involves an aqueous coating solution having a pH of 3 to 8, and comprising [SiO$_x$(OH)$_y$]$_n$ particles, wherein 0<y<4, 0<x<2 and n is an integer, having a particle size of from 10 nm to 60 nm with a tolerance of ±10%, and a surfactant mixture, the particles being obtainable by hydrolytic polycondensation of tetraalkoxysilanes in an aqueous-alcoholic-ammoniacal medium at temperatures preferably between 35° C. and 80° C. with subsequent removal of ammonia and alcohol from the resultant dispersion and subsequent addition of a surfactant mixture comprising 15–30% by weight of anionic surfactants, 5–15% by weight of non-ionic surfactants and less than 5% by weight of amphoteric surfactants. In particular, the invention involves an aqueous coating solution having a pH of from 3 to 8, and comprising preferably 0.5–5.0% by weight of [SiO$_x$(OH)$_y$]$_n$ particles, where 0<y<4 and 0<x<2 and n is an integer, having a particle size of from 10 nm to 60 nm with a tolerance of ±10%, and preferably from 0.005 to 0.5% by weight, based on the coating solution, of a surfactant mixture, the particles being obtainable by hydrolytic polycondensation of tetraalkoxysilanes in an aqueous-alcoholic-ammoniacal medium at temperatures between 35° C. and 80° C. with subsequent removal of ammonia and alcohol from the resultant dispersion preferably by steam distillation and subsequent addition of a surfactant mixture comprising 15–30% by weight of anionic surfactants, 5–15% by weight of nonionic surfactants and less than 5% by weight of amphoteric surfactants.

The solution according to the invention is surprising to the person skilled in the art since the standard work on sol-gel technology by C. J. Brinker and G. W. Scherer, Sol-Gel Science, Academic Press, 1990, page 104, FIG. 5, discloses that the PZC (point of zero charge) and IEP (isoelectric point) of $SiO_2$ particles is zero, and thus the stability of the sol is at its greatest, at a pH of 2. it was therefore unexpected that the sol still has adequate stability at a pH of greater than 3.

It is known that the properties of materials obtained by sol-gel processes are highly dependent on the pH. It is therefore surprising that the deposited layer has such high strength, since investigations by Klimentova (C. J. Brinker and G. W. Scherer, Sol-Gel-Science, Academic Press, 1990, page 389) disclose that the modulus of elasticity of gel layers is at its greatest at the isoelectric point of the $SiO_2$ particles. For this reason too, the person skilled in the art would have set the pH of the sol to 2.

The invention also provides a process for the preparation of the coating solution by
- addition of a tetraalkoxysilane to an aqueous-alcoholic-ammoniacal hydrolysis mixture preferably at temperatures between 35° C. and 80° C.,
- removal of ammonia and alcohol from the resultant dispersion, e.g., by steam distillation, and adjustment of the pH to 3–8, and
- addition of preferably from 0.005 to 0.5% by weight, based on the coating solution, of a surfactant mixture comprising 15–30% by weight anionic surfactants, 5–15% by weight nonionic surfactants and less than 5% by weight amphoteric surfactants.

The invention furthermore relates to an abrasion-resistant, optically transparent, reflection-reducing silicon dioxide layer on glasses having a continuously adjustable refractive index of from 1.25 to 1.40.

The coating solution according to the invention is stable to gelling within the observation period hitherto of about 2 years. The particles in the coating solution have a spherical shape with mean particle diameters of from 10 nm to 60 nm, preferably 30 nm–40 nm and particularly preferably 35 nm, with a tolerance of ±10%. Compared with the aqueous sol disclosed in DE 198 28 231, the coating solution according to the invention exhibits a significantly smaller Tyndall effect, which is an indication of low agglomeration of the particles in the solution. The porous layer obtained with the coating solution can be set to a refractive index of from 1.25 to 1.40, so that, for example, the residual reflection of a coated, low-iron glass sheet is between 0.02 and 1.6%. The position of the reflection minimum can easily be set by adjusting the layer thickness in the range 500–800 nm.

The layer exhibits extremely good mechanical stability for porous layers. Abrasion experiments in accordance with DIN EN 1096-2 show merely a color shift, caused by a slight reduction in the optical layer thickness, after 100 or 500 strokes, but no damage to the layer due to scratches. This color shift is virtually impossible to measure. The layer is likewise not damaged by rubbing with a dry cloth. Layers obtained from coating solutions with known sols exhibit considerable damage to the layer after only 10 strokes in the same abrasion test.

Tilting table experiments with layers of known sols show that the static friction is considerably lower in the layers produced in accordance with the invention. Glass sheets coated in accordance with the invention can be exposed to temperatures of above 700° C. without the applied layer sintering in the process and a loss in transmission being observed. The hardening process is carried out here in a way which corresponds to the production of safety glass. This means that the coated glass is heated to the softening point and then quenched. Layers of known sol-gel systems sinter from a temperature of about 550° C. ((Sol Gel Science, C. F. Brinker, G. W. Scherer, Academic Press 1990, pp. 583, 631).

As a consequence of the high porosity and the consequent low refractive index and the abrasion resistance of the layers according to the invention, the latter are particularly suitable for the production of high-transmission glass sheets for use as cover sheets in solar energy systems, for example for solar collectors and solar cells. The solar transmission as the weighted average of the transmission over the entire solar spectrum (AM 1.5 global standard spectrum) is 95%.

The coating solution according to the invention is preferably prepared in three steps. In a first step, firstly an $SiO_2$ sol is prepared by hydrolytic polycondensation of tetraalkoxysilanes.

To this end, the tetraalkoxysilane is introduced into an aqueous-alcoholic-ammoniacal hydrolysis mixture and mixed intensively. Suitable tetraalkoxysilanes which can employed are all aliphatic alcohol orthosilicic acid esters that can easily be hydrolyzed. Primarily suitable here are the esters of aliphatic alcohols having 1–5 carbon atoms, such as, for example, of methanol, ethanol, n- or i-propanol, and the isomeric butanols and pentanols. These can be employed individually, but also as a mixture. Preference is given to the orthosilicic acid esters of $C_1$–$C_3$-alcohols, in particular tetraethoxysilane. Besides aliphatic alcohols, the hydrolysis mixture preferably has a content of from about 0.05 mol/l to about 8 mol/l of ammonia and of from about 1 mol/l to about 25 mol/l of water. Suitable as the alcohol component are aliphatic $C_1$–$C_5$-alcohols, preferably $C_1$–$C_3$alcohols, such as methanol, ethanol and n- or i-propanol. These may be present in the hydrolysis mixture individually, but also as a mixture with one another. The tetraalkoxysilane is preferably added to the hydrolysis mixture in one portion, it being possible for the reactant to be in pure form or alternatively in solution in one of the said alcohols. In order to produce the $SiO_2$ particles, a concentration of tetraalkoxysilane in the hydrolysis mixture of between about 0.01 and about 1 mol/l can be selected. After the reactants have been combined, the reaction commences immediately or after a few minutes, which is evident from immediate opalescence of the reaction mixture due to the particles formed. After in general not more than 15–30 minutes, in unfavorable special cases also longer, the reaction is complete. Depending on the choice of reactants and their concentrations in the reaction mixture, particles having a mean diameter of between 10 nm and 60 nm can be obtained.

This first step of the process according to the invention is preferably carried out with reaction mixtures which comprise 10 mol/l–25 mol/l of water, from 0.1 mol/l to 4.5 mol/l of ammonia, from 5 mol/l to 25 mol/l of alcohol and 0.1–0.5 mol/l of tetraalkoxysilane. Particles having mean diameters of between 10 nm and 60 nm are obtained here. At this stage, samples can be taken from the sol in order to analyse the particles, for example with the aid of electron microscopy, for their particle size, shape fidelity and particle size distribution.

It has proven advantageous to carry out the reaction for the production of the primary particles at elevated temperature. Favorable temperatures here are between 35° C. and 80° C., preferably between 40° C. and 70° C. It has been found that the particle size scatter decreases at elevated temperature, although so does the mean particle size. At lower temperatures, i.e. at room temperature, larger particles with greater size scatter are obtained under otherwise identical conditions.

The first step of the process according to the invention is described in greater detail in U.S. Pat. No. 4,775,520.

The sol obtained is set to a pH of between 3 and 8, preferably 5–6, using dilute hydrochloric acid, sodium hydroxide solution or ammonia. 0.005–0.5% by weight, preferably 0.05–0.2% by weight, based on the coating solution, of a surfactant mixture comprising 15–30% by weight of anionic surfactants, 5–15% by weight of nonionic surfactants and less than 5% by weight of amphoteric surfactants is subsequently added.

The coating solution is adjusted to a solids content of 1–3% by weight. The solids content is dependent on the type of coating method. Suitable methods for the application of the coating solution to the substrate are dip methods, spray methods or spin-coating methods. The drawing rate in dip methods is 0.5–50 cm/min.

In a particular embodiment of the coating solution according to the invention, 0.001–0.1% by weight, based on the coating solution, of a suitable preservative are added.

In a further embodiment, solvents, for example lower alcohols having a chain length of C1–C4, dioxane, tetrahydrofuran, acetone in a concentration of 0.5–50% by weight, based on the coating solution, or 2-methoxy-1-propanol or 2-butanone in a concentration of 0.5–20% by weight, based on the coating solution, are added to the coating solution. Ethanol is preferably employed in a concentration of 15–25% by weight.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

The entire disclosures of all applications, patents and publications, cited above or below, and of corresponding German application No. 100 51 725.0, filed Oct. 18, 2000 are hereby incorporated by reference.

EXAMPLES

Example 1

A hydrolysis mixture consisting of 4.9 l of water, 9.6 l of ethanol and 250 g of 25% ammonia is prepared. 1250 g of tetraethoxysilane warmed to 70° C. are added in one portion to this hydrolysis mixture, likewise heated to 70° C., with intensive mixing. An $SiO_2$ sol having mean particle diameters of 25 nm with a tolerance of ±10% is obtained. The reaction mixture is subsequently subjected to steam distillation in order to remove alcohol and ammonia. The aqueous $SiO_2$ sol obtained is adjusted to a pH of 8, and 0.2% by weight of a surfactant mixture consisting of 10.0% by weight of fatty alcohol ether sulfate (C12/C14-fatty alcohol, 2 mol of EO), 5.6% by weight of alkylbenzenesulfonate, 5.5% by weight of fatty alcohol ethoxylate and 8.9% of the balance of water are added.

Example 2

The coating solution obtained in accordance with Example 1 is filtered through a 0.2 μm filter and employed without further additives for the subsequent coating by dip coating. Glass sheets are cleaned in a commercially available laboratory washer at above 90° C. with addition of a commercially available detergent. The commercially available detergent comprises less than 5% by weight of chlorine-based bleach, 15–30% by weight of phosphates, 5% by weight of NaOH, as well as carbonates, silicates and sulfates. The glass sheets are subsequently dipped into the coating solution and withdrawn at a drawing rate of 10 cm/min.

After the removal, the coating is dried in a stream of air, and the coated glass plate is heated for five minutes at 650° C. in a fan-assisted oven. The coated glass plate exhibits a uniform hue, which indicates an even layer thickness of the coating.

The abrasion resistance of the applied layer was tested in accordance with DIN EN 1096/2. After 500 strokes, merely a color shift was observed, caused by a slight reduction in the optical layer thickness. The layer exhibited no damage at all. Scratches were not evident.

What is claimed is:

1. An aqueous coating solution having a pH of from 3 to 8, comprising $[SiO_x(OH)_y]_n$ particles, where $0<y<4$, $0<x<2$, and n is an integer, having a particle size of from 10 nm to 60 nm with a tolerance of ±10%, and 0.005 to 0.5%, by weight, based on the coating solution, of a surfactant mixture comprising 15–30% by weight anionic surfactants, 5–15% by weight non-ionic surfactants and less than 5% by weight amphoteric surfactants, based on the surfactant mixture.

2. A solution according to claim 1, wherein the concentration of the $[SiO_x(OH)_y]_n$ particles is 0.5–5.0% by weight, based on the coating solution.

3. A coating solution according to one of claim 1, wherein a solvent is present.

4. A coating solution according to one of claim 3, wherein the solvent is present in a concentration of 0.5–50% by weight, based on the coating solution.

5. A coating solution according to claim 1, wherein 0.001–0.1% by weight of a preservative is present.

6. An aqueous coating solution having a pH of from 3 to 8, comprising $[SiO_x(OH)_y]_n$ particles, where $0<y<4$, $0<x<2$, and n is an integer, having a particle size of from 10 nm to 60 nm with a tolerance of ±10%, and 0.005 to 0.5% by weight of a surfactant mixture, said particles being obtainable by hydrolytic polycondensation of tetraalkoxysilanes in an aqueous-alcoholic-ammoniacal medium, with subsequent removal of ammonia and alcohol from the resultant dispersion, said solution being obtainable by subsequent addition thereto of a surfactant mixture comprising 15–30% by weight of anionic surfactants, 5–15% by weight of nonionic surfactants and less than 5% by weight of amphoteric surfactants.

7. A solution according to claim 6, wherein polycondensation is conducted at 35° to 80° C.

8. A solution according to claim 6, wherein ammonia and alcohol are removed by steam distillation.

9. A process for the preparation of an aqueous coating solution having a pH of from 3 to 8, comprising $[SiO_x(OH)_y]_n$ particles, where $0<y<4$, $0<x<2$, and n is an integer, having a particle size of from 10 nm to 60 nm with a tolerance of ±10%, a surfactant mixture comprising 15–30% by weight anionic surfactants, 5–15% by weight non-ionic surfactants and less than 5% by weight amphoteric surfactants, based on surfactant mixture, said coating solution being suitable for production of abrasion-resistant SiO$_2$ anti-reflection layers and said process comprising adding of a tetraalkoxysilane to an aqueous-alcoholic-ammoniacal hydrolysis mixture, removing ammonia and alcohol from a resultant dispersion and adjusting of the pH to 3–8, and adding the surfactant mixture.

10. A process according to claim 9, wherein the coating solution contains 0.005 to 0.5% by weight based on the coating solution, of the surfactant mixture.

11. A process according to claim 9, wherein the tetraalkoxysilane is added at a temperature of 35–80° C.

12. A process according to claim 9, wherein ammonia and alcohol are removed by steam distillation.

* * * * *